May 21, 1929.  P. v. KÖRÖSY  1,713,877
APPARATUS FOR THE FILLING OF GRANULAR AND POWDERED MATERIAL
Filed July 1, 1926   6 Sheets-Sheet 1

P. V. Körösy
inventor
By: Marks & Clark

May 21, 1929.  P. v. KÖRÖSY  1,713,877
APPARATUS FOR THE FILLING OF GRANULAR AND POWDERED MATERIAL
Filed July 1, 1926  6 Sheets-Sheet 2

P. V. Körösy
inventor
By: Marks & Clerk
Attys

May 21, 1929.  P. v. KÖRÖSY  1,713,877
APPARATUS FOR THE FILLING OF GRANULAR AND POWDERED MATERIAL
Filed July 1, 1926   6 Sheets-Sheet 4

May 21, 1929. P. V. KÖRÖSY 1,713,877
APPARATUS FOR THE FILLING OF GRANULAR AND POWDERED MATERIAL
Filed July 1, 1926   6 Sheets-Sheet 5

P. V. Körösy
Inventor
By Marks & Clerk
Attys

Patented May 21, 1929.

1,713,877

UNITED STATES PATENT OFFICE.

PAUL v. KÖRÖSY, OF BUDAPEST, HUNGARY.

APPARATUS FOR THE FILLING OF GRANULAR AND POWDERED MATERIAL.

Application filed July 1, 1926. Serial No. 119,938.

The subject of the invention is an arrangement for continuously and automatically filling granular or powdered material into packets of textile fabric, and is particularly suitable for filling in measured-off quantities of tea, ground coffee, spices, gun powder, and the like.

The arrangement comprises a loom, preferably a ribbon loom, for making a tubular double fabric with interposed flat-woven portions and, if desired, continuous flat edges at the sides, a filling device with automatic weighing means, which comes into action on the operation of the loom being temporarily interrupted, and a cutting device for severing the filled packets across the flat-woven portions of the fabric, whereupon the said packets fall into a conveyor or on to a conveyor band.

This arrangement is in many cases combined with a labelling device for providing each filled packet with a label, which is itself attached to a thread taken from the fabric itself.

The accompanying drawings represent constructional examples of the invention by way of example.

Figure 1:
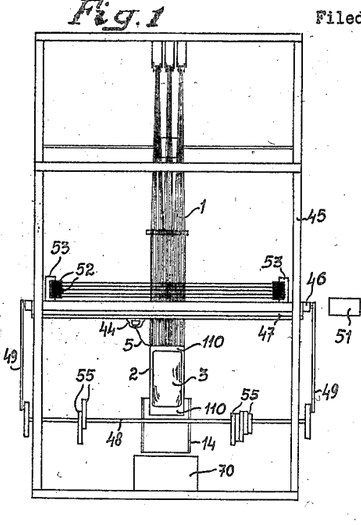
Figures 1 and 2 show, respectively, a front and a side view of a vertical loom for the production of the tubular fabric according to the invention.
Figure 2:
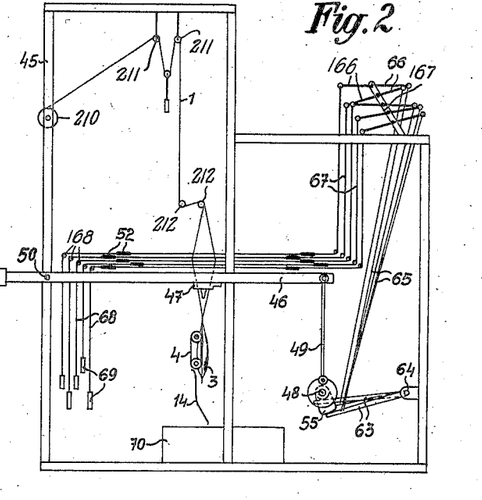
Figures 11, 20, 21, 22:
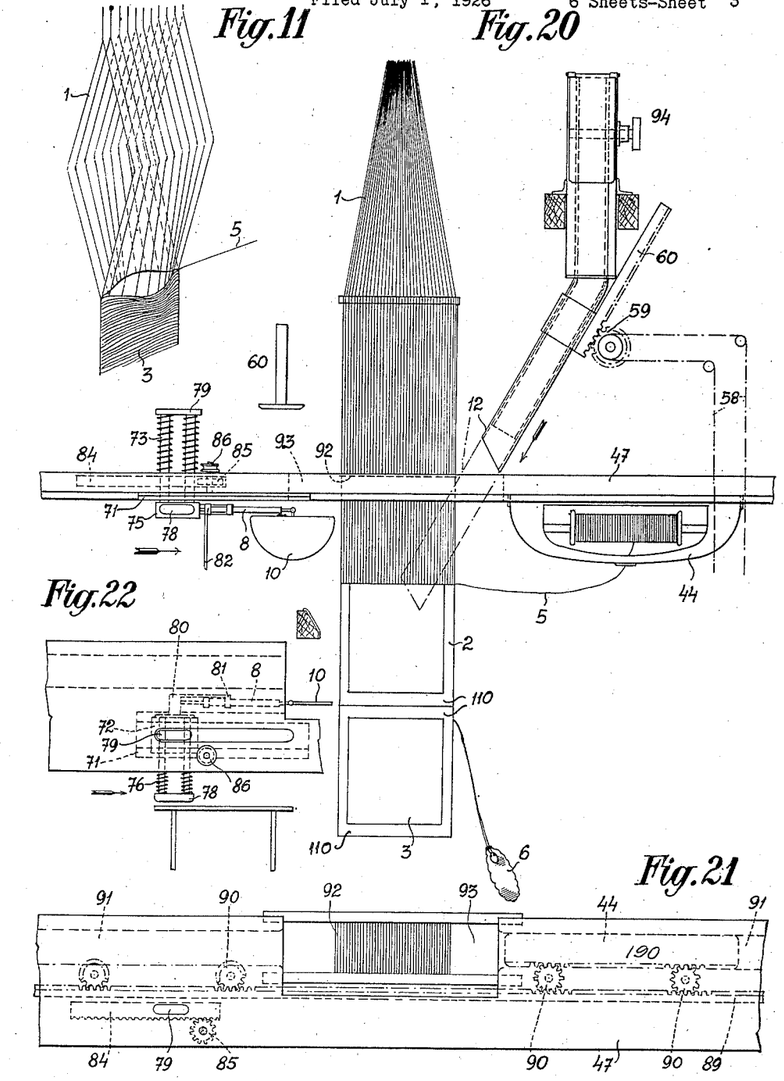
Figure 11 shows the same view as Figure 8 and also shows the free end which is used for labelling purposes.
Figure 20 is a side view of the arrangement which effects the opening of the packets, and also of the feeding and weighing appliance.
Figures 21 to 29 show details.
Figure 18:
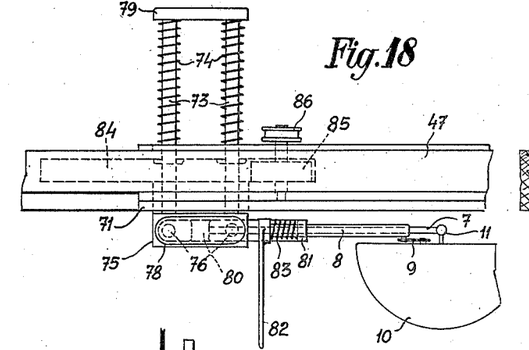
Figures 18 and 19 show side and front views, the latter partly in section, of the operative arrangement of the mechanism for effecting the opening of the packets.
Figure 19:
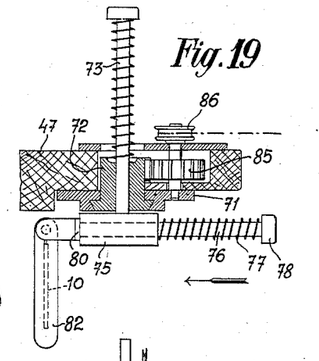

Referring to Figures 1 and 2, the production of the packets, which are later to be filled, takes place as follows:

In the example shown in the drawings, two groups of warp threads 1 run vertically in the loom, from a warp beam 210; being tensioned by means of the weighted tensioning pulleys 211 in known manner. The warp threads are passed round guides 212 to the eyes of the healds 52 which are slidably mounted in horizontal guides 53, so as to be capable of sliding horizontally in known manner for forming the shed. The healds are weighted at one end by weights 69 attached to the heald cords 68 which are guided over pulleys 168, while at the other end they are connected by means of cords 67 to the arms 166 of double levers 66 pivoted in uprights 167 fixed to the frame 45 of the loom. The other arms of the levers 66 are connected by means of pull members 65 to the treadles 63 which are pivoted on the loom frame on the pivot 64 and operated in the usual manner by the cams or tappets 55 on the shaft 48. This common arrangement, which is generally employed in some form or other in all looms, serves for the lifting of the warp threads 1 in groups, which pass through the heald, the shuttle 44 (Fig. 20) being thrown through the shed which is being formed at the time, for the purpose of inserting the weft. The shuttle 44 is slidably mounted between guides 91 of the batten 47 (Fig 21) and is driven by means of gear wheels 90 engaging a rack 190 on the shuttle, which gear wheels also engage with the toothed rack 89, which extends over the complete length of the batten 47 and is slidably mounted on the batten in known manner. The toothed rack 89 is reciprocated intermittently in the manner described below, whereby the shuttle 44 is thrown backward and forward. The mechanism for reciprocating the rack 90 is not illustrated in the drawing as it does not itself form part of the present invention. The shuttle driving rack may be reciprocated in a similar manner to the rack 60 (see Fig. 3). The continuous motion of the shuttle is ensured by proportioning its length so that the rack 190 always engages with at least one of the toothed wheels 90.

The batten 47 is mounted on the swords 46 (Fig. 2) which are horizontal and pivoted on a shaft 50 extending across the loom 45. The swords 46 are provided with the counterpoise 51, and constitute the weaving frame and are actuated by connecting rods 49 and cranks 149 fixed on the shaft 48. When the swords 46 are rocked downwardly, the batten 47 together with the reed 92 (Fig. 21) moves down and beats up the weft threads picked by the shuttle against the woven fabric. On the batten being raised again, the shuttle is free to make another pick, the rack being reciprocated alternately from left to right and right to left between each beating up movement of the batten in the well-known manner.

A double fabric 3 (Fig. 1) is produced on this loom, if desired, with flat woven cross strips 110, and continuous flat edges 2 at the sides, that is a tube interrupted here and there and with single fabric side edges 2.

The tubular double fabric is moved along by means of a transport belt 4 (Figs. 2 and 30), which is provided here and there with needle groups, which penetrate into the edges of the material, and the double fabric is moved forward to an extent corresponding to the progress of the weaving process, and the necessary tension is given to the material at the same time.

The intermittent motion of the transport belt 4 takes place by means of a belt 108 from the axle of the ratchet-wheel 107, which is put into operation from time to time by means of a pawl which rests on the ratchet lever 106. The pawl moves the ratchet wheel forward by one tooth, every time the striker 104, which is arranged on the weaving frame 46, strikes the head 105 of a vertical rod slidably mounted on the loom below the striker, which rod is connected to the ratchet lever so as to actuate the latter when depressed by the striker 104.

According to the invention, the weaving process is now interrupted, before the individual single fabric cut off strip 110 is woven. This is effected by means of the weft counter which is of a known type and which is so arranged for this purpose that, after a pre-determined number of weft threads have been counted a striker is caused to stop the loom by any kind of releasing device, which is also of known type. After the interruption of the weaving process, those warp threads 1 which have not yet been used for making the fabric are separated (Figs. 7 to 10), and the finished packet, which is still unfastened at the top, is opened for the introduction of the material to be filled in.

Before this arrangement is brought into operation, an appliance which is used repeatedly in the machine according to the invention, and which serves for the driving of intermittently moved constituent parts, has first to come into operation. To avoid repetition, this appliance is described once only, with reference to Figs. 3 and 6.

Figures 3, 4, 5, 6:
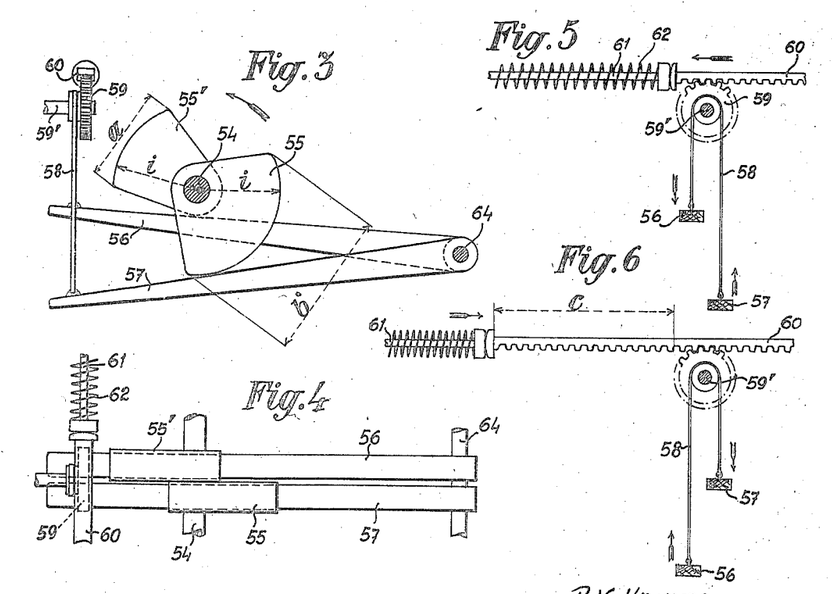
Figures 3 and 4 show a front view and a plan view of an intermittent driving arrangement, which serves for the driving of several members of the machine.
Figures 5 and 6 show side views of the arrangement represented in Figures 3 and 4 from two different view points.

The constituent part which is to be moved intermittently, for instance rod 61, is surrounded by the spiral spring 62, and is made in one piece with the toothed rack 60, or is supported against it by means of a union as shown in Figure 5. Toothed rack 60 engages with the toothed wheel 59 resting on the shaft 59′. On the boss of the toothed wheel 59 a belt 58 is placed, both the ends of which are connected to the feet 56, 57, which swing about the shaft 64, which feet alternately come under the action of cams 55, 55′ on the shaft 54. The feet 56, 57 are in this way operated to an extent dependent on the dimensions of the cams 55, 55′ so that shaft 59′ is turned proportionate to this movement, and this turning is then imparted to toothed rack 60, so that the member 61 is given a definite longitudinal movement $c$. The length and time period of the path $c$ are defined by the shape and length $a$, $b$ of the cams.

This appliance 44 also serves among other things, for the movement of the toothed rack operating the shuttles, and further for the driving of the knife 13 (Fig. 30) used for the cutting off of the filled packets from the main length of material, as described below, as well as for the driving of the arrangement for the opening of the packets and other arrangements described below.

The arrangement for the opening of the packets will be described first.

Figures 7, 8, 9, 10, 12, 13, 14, 15, 16, 17:
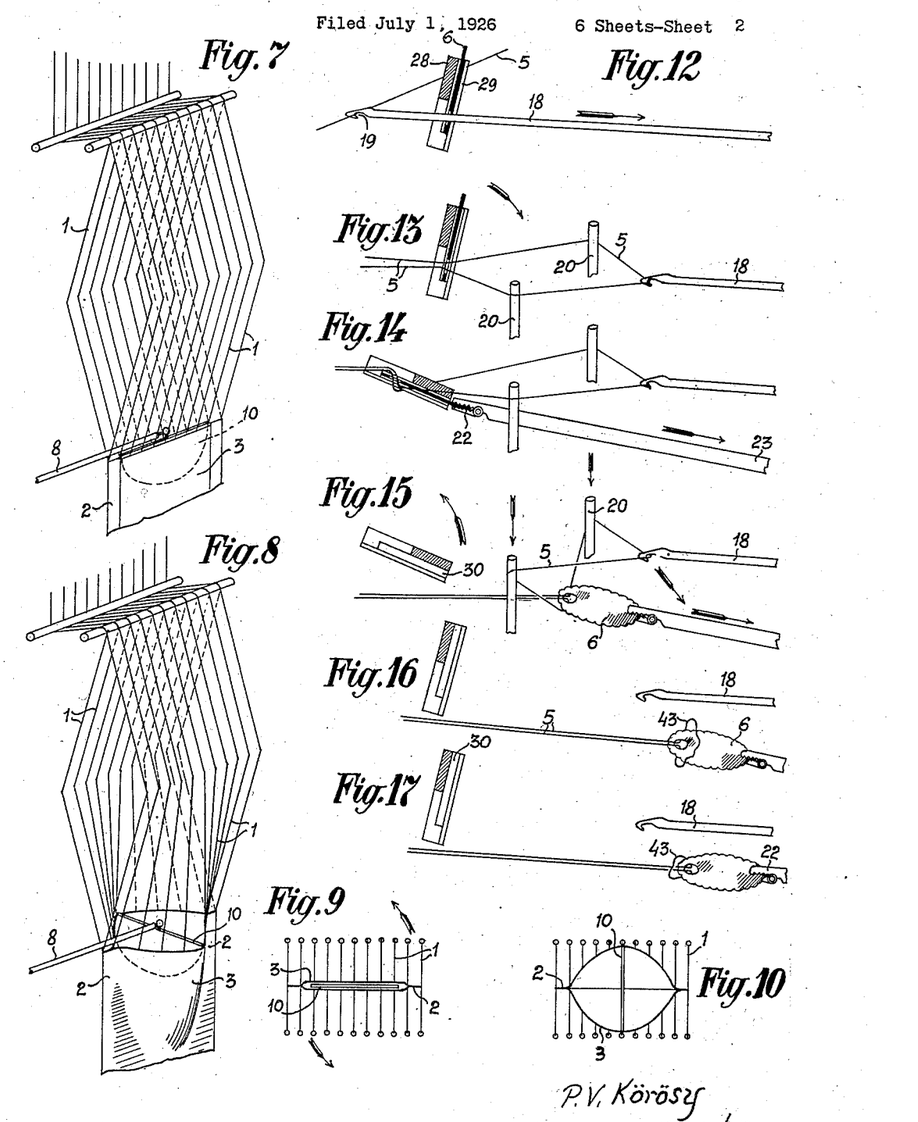
Figures 7 and 8, 9 and 10 show perspective sketches and diagrammatic sections respectively of the opening of the packets, in two different positions of the member which effects this opening.
Figures 12 to 17 show the loop formation, and the manner and method of removing the label from its conveyor.

After weaving a definite number of weft threads the weaving frame 46 is stopped in its uppermost position, and the arrangement serving for the opening of the packets, fixed on the batten 47, is then operated, as can be seen in Figures 7 and 10, also Figures 18—26 and 30.

This consists of a semi-circular flat member 10 (Figure 18) which by means of a link 11 is linked to the rod 7 which moves in the sleeve 8; sleeve 8 is connected to the member 10 by means of a link joint 9. A supporting bed 71 (Fig. 19) is fastened to the batten 47, a support 72 through which a pair of spindles 73 penetrates being guided in the longitudinal direction of the said bed 71. The upper ends of the spindles 73 are connected together by means of a union 79, against which the spiral springs 74 which surround the one end of the spindles are supported. The lower ends of the spindles are connected together by means of a block 75

Figure 23:
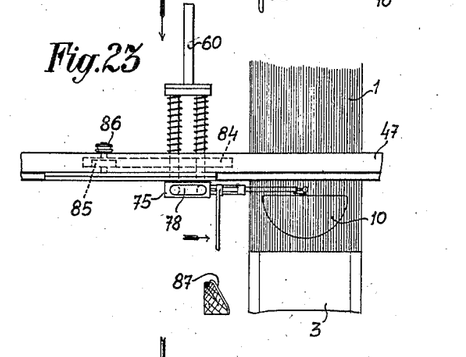
Figure 24:
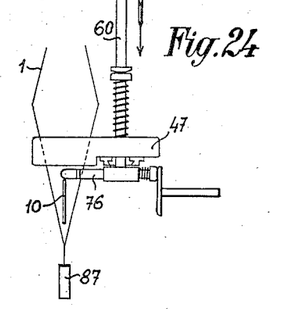
Figure 25:
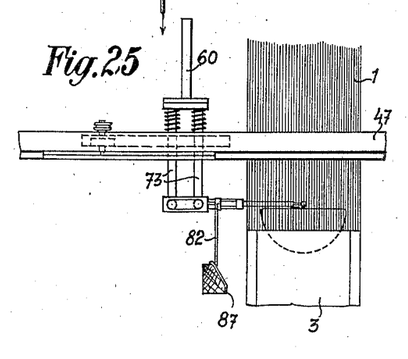
Figure 26:
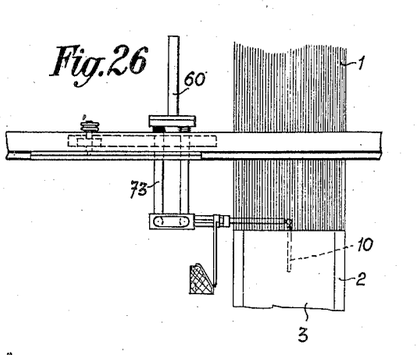

(Fig. 19), through which engage a pair of spindles 76 (Fig. 18) similarly surrounded by spiral springs 77 which spindles run in a direction perpendicular to the spindles 73, that is, horizontally. Their ends are connected together on the one side by the union 78, on the other side by the union 80, the shaft 7 which carries the member 10 being fastened to the said union 80. Union 80 has an angular attachment 81, through which sleeve 8 passes, and at the one end of which projects a vane 82 serving for the control of the movement of the member 10, which vane works together with an inclined striker 87 which lies in its path (Figs. 23, 25, 26). Between the angular attachment 81 and the vane 82 a spiral spring 83 is arranged. 85 is a toothed wheel operating together with a toothed rack 84, which toothed wheel is driven by a belt pulley 86, and which serves for the forward movement of the member 10. In order that this on the other hand may also move in the plane of elevation, that is, may be lowered, rack 60 of an operating device represented in Figures 3 to 6 acts on the head (Figs. 23, 24) connecting the spindles 73 with each other, the spindles being driven against the action of springs 74 through the block 75 until the member 10 connected to the shaft 7 by way of link 11 arrives with its longitudinal axis in the plane of symmetry of the warp thread groups 1, which are held apart (Fig. 24).

Toothed wheel 85 is thereupon driven by belt pulley 86; thereby the support 72 sliding in the bed plate 71, by means of the toothed rack 84 engaging with the toothed wheel 85 and connected to the said support 72, as well as the block 75 and furthermore the shaft 7 together with the member 10 will be moved in a horizontal direction between the separated warp threads.

Thereupon rack 60 comes into action on the head 79 in the direction of the arrow (Fig. 23), so that the pair of spindles 73 and with them the member 10, are moved downwards against the action of the springs 74, or lowered into the completely woven packets, which are still open at the top (Figs. 7, 9, and 25). This movement consists of two phases. During the first half of the downward motion the member 10 stands parallel to the already woven wall of the packet (Fig. 9) (Phase I), while during the subsequent Phase II the vane 82 of the sleeve 8 presses against the inclined striker 87 (Fig. 25), and during the further downward motion vane 82 causes the sleeve 8 to perform a horizontal motion on the shaft 7 against the action of the spring 83, whereby the member 10 is turned through 90° about the pivot 11 by means of the rod 9 connecting the sleeve 8 with member 10 by a loose joint (Figs. 8-10).

Figures 27, 28, 29, 30:
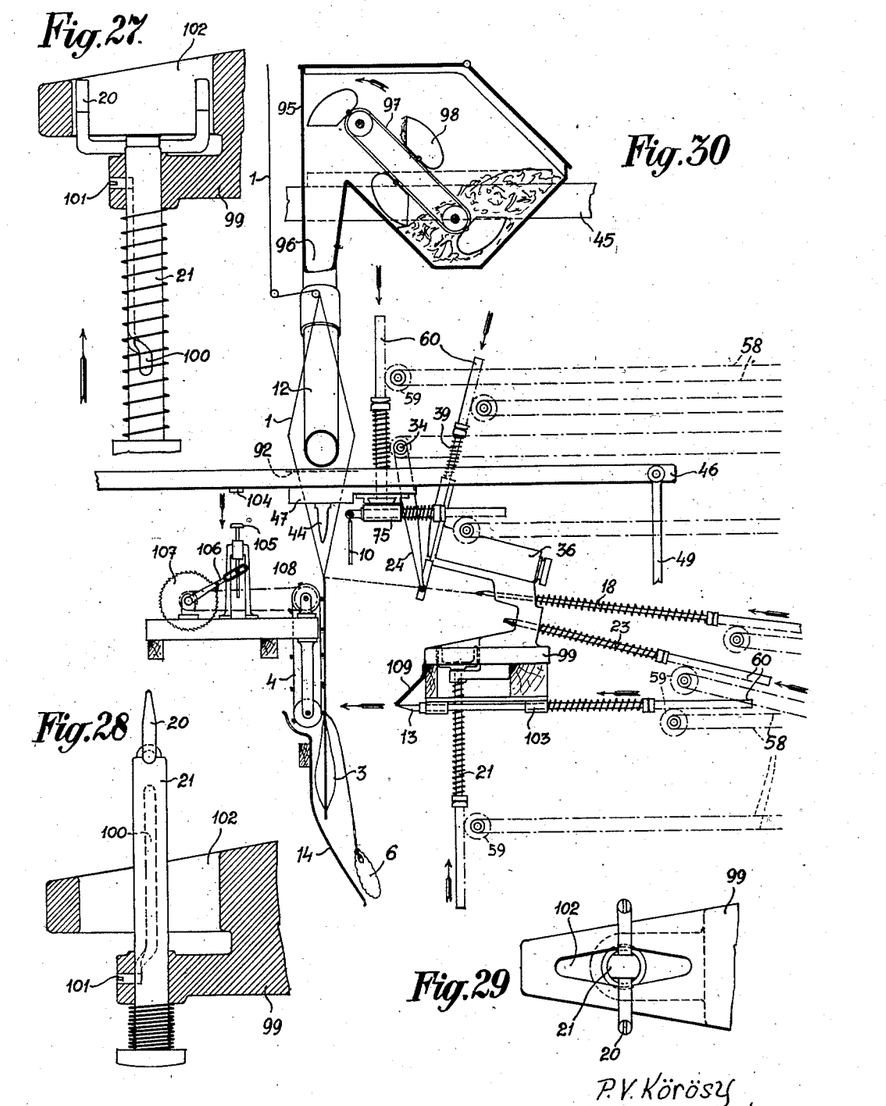
Figure 30 is a side view of the complete assembly of a constructional form of the machine acording to the invention.

Into the packets opened in this way the material is filled in measured off quantities in the manner described below, and thereupon the member 10 is drawn back into its original position, then the single fabric binding edge 110 is produced and the filled packets cut off with the knife 13 (Fig. 30).

The measuring appliance is also seen in this figure, and consists of a container 95 provided with outlet tube 96, discharging into the funnel 12, in which container the material to be filled in is stored. In this container the transport belt 97 provided with cups 98 is arranged, which belt picks up during its movement a quantity of material, determined by the volume of the cup, from the stock in the container 95 and scatters it through the outlet pipe 96 into the funnel 12. This is lowered into the cavity of the opened packet (Fig. 20) by means of the driving arrangement 59, 60 already described in connection with Figs. 3-6, while the movement of the cup mechanism is caused by a belt pulley 94. As soon as the material has dropped into the packet, the cup mechanism is brought to rest by any suitable braking device. After the withdrawal of the funnel 12 from the packet the member 10 is brought back into its original position by the reversal of the above described sequence of operations and the packet is closed by single fabric.

The cutting off of the filled, closed packet is effected by means of the knife 13, which is covered by the guard 109. To render a regular cutting off possible, the knife 13 must be moved in such a way that it meets the breadth of the material between two groups of needles. The complete packets then arrive by means of the channel 14 into the collector 70 (Figs. 1 and 2).

As it is necessary, in many industries, to provide the packets with labels, the machine also possesses a labelling appliance. For the purpose of applying the label before the cutting off of the packets, during the process of weaving, in the lower or upper flat woven part a weft thread 5 (Fig. 11), which preferably is different from and stronger than the rest of the threads and woven in by means of the usual change-box slay, is drawn out from the fabric, and a label 6 suspended on its end.

This process is explained with reference to Figures 12 to 17, also 31 to 36.

The label 6 (Figs. 32-36) to be drawn on to the thread 5 (Fig. 31), as described below, is stretched in a conveyor 26 which can swing on the axle 25, and possesses a perforation 17, through which a needle 18 which is displaceable in a horizontal plane and which is provided with hook 19, engages (Fig. 12), and the loop formed by the said needle is pulled through the perforation in the label as a double thread by the needle 18; then the loop is drawn out by means of the bent limb 20 of the labelling appliance described below, and thus produces a shed. The appliance consists of a support 99 with a central slot 102 (Figs. 27, 28), in which the bent limb 20 is mounted, which possesses at its lower end a spindle 21 surrounded by a spiral spring, in which spindle a vertical slot 100 is formed, which is bent at its lower end through 90° in the form of part of a helix, and then proceeds vertically again. A rod 101 projects out of the guide 99 into this slot, and turns the spindle, with its upward motion occurring positively by means of an appliance analogous to the arrangement described in connection with Figures 3–6, so that the limbs 20 arrive into the position according to Figure 13, whereby a shed occurs. At the same time the label is moved down in the direction of the arrow (Fig. 13), and gripped by the underside of the shed by means of the forward-driven grip 22 which rests on shank 23, and moved backwards in the direction of the arrow (Fig. 14). After the starting point of the loop is secured in the fabric, a knot 43 (Fig. 17) is formed at the label by the lowering of the bent limb 20 into its original position on the one side, and by the continued withdrawal of the shank 23, on the other side.

After the removal of the grip 22 the label 6 then drops with the thread 5, and the appliance is ready for a fresh working action.

A constructional example of this labelling appliance is represented in Figures 27–36.

Figures 31, 32, 33, 34, 35:
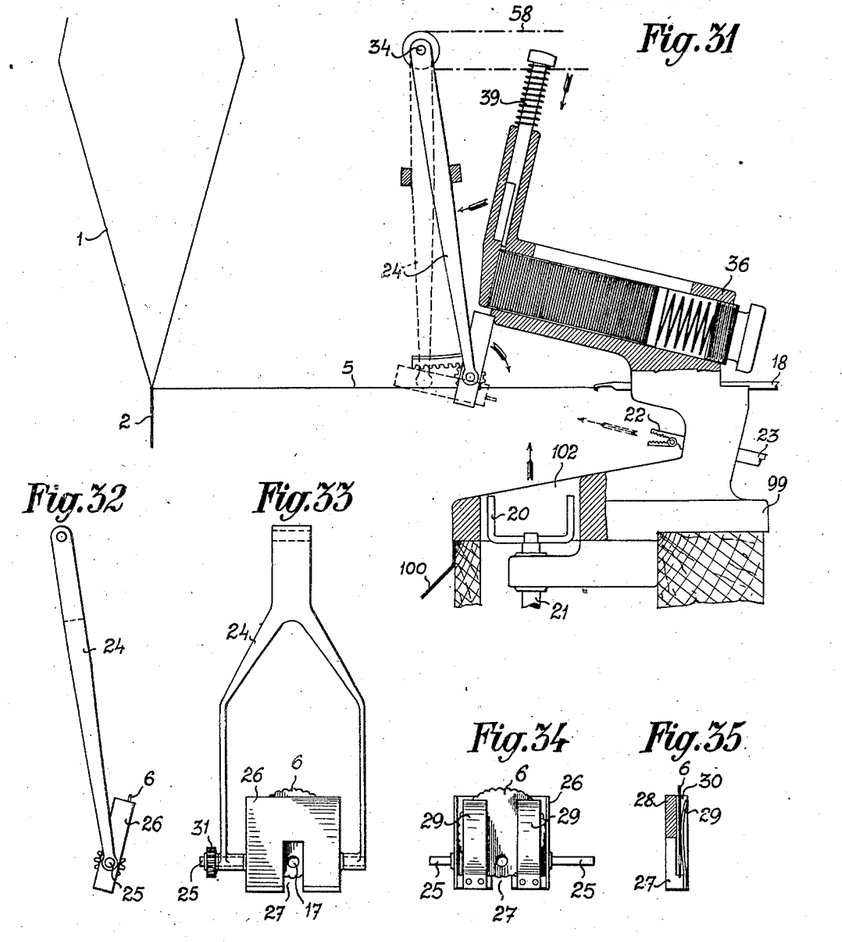
Figures 31 to 36 are detail views on a larger scale of portions of the labelling device.
Figure 36:
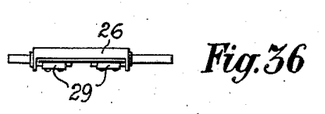

The labels 6 are arranged one behind the other in a magazine 36 (Fig. 31), and are driven forward by means of a spring. The foremost label is forced out of a guide 38 under the action of a knife 39 sliding downwards in the guide in the direction of the arrow, and arrives in the frame 26 (Fig. 32) which is provided with a guide 30 (Fig. 35) for the label 6. Two leaf-springs 29 press the label against the back wall 28 of the frame 26, which has a slot 27 at the bottom. The frame 26 is mounted in the two limbs of a stirrup 24 (Figs. 32–33), a small toothed wheel 31 resting on the one bearing pivot (25), which works together with toothed segment 32. Stirrup 24 is pivoted about the pivot 34, and is always limited at both its end positions by a striker. The swinging movement of the pivot 34 takes place by means of the drawing member 58, which has already been described. (Fig. 31.) In the position according to Figure 31 the frame 26 containing the label 6 is supported against the frame of the machine, and drops in the direction of the arrow into the position shown by dotted lines when the stirrup 24 swings outwards, whereby the pinion 25 rolls along the toothed segment 32, and the frame 26 is thus turned about approximately 90°.

The needle 18 is guided horizontally in the frame of the machine and the grip 22, 23 slantingly. The operation of the bent limb 20, 21 mounted in the lower part 99 of the frame of the machine has already been described, as has also the movement of the knife 13 which is guided in the mount 103 and which is covered by the sheet 109.

All members of the machine are driven and controlled in such a way that the phases of the loop formation represented diagrammatically in Figures 12–17 follow in correct sequence after each other.

What I claim is:—

1. An arrangement for the continuous filling of pocket-shaped textile fabrics with granular and powdered material, comprising in combination a ribbon loom, capable of producing a tubular double fabric with interposed flat-woven parts, means for periodically interrupting the weaving operation, a filling device capable of acting during the periodic interruptions in the weaving operation and an automatic measuring device, as set forth.

2. An arrangement for the continuous filling of pocket-shaped textile fabrics with granular and powdered material, comprising in combination a ribbon loom, capable of producing a tubular double fabric with interposed flat-woven parts, means for periodically interrupting the weaving operation, a filling device capable of acting during the periodic interruptions in the weaving operation, an automatic measuring device and a cutting device capable of cutting off the pocket-shaped portions of the fabric transversely through the interposed flat-woven parts, as set forth.

3. An arrangement for the continuous filling of pocket-shaped textile fabrics with granular and powdered material, comprising in combination a ribbon loom, capable of producing a tubular double fabric with interposed flat-woven parts, means for periodically interrupting the weaving operation, a filling device capable of acting during the periodic interruptions in the weaving operation, an automatic measuring device, a cutting device capable of cutting off the pocket-shaped portions of the fabric transversely through the interposed flat-woven parts, and means for attaching a label to each portion to be detached from the fabric, as set forth.

4. An arrangement for the continuous filling of pocket-shaped textile fabrics with granular and powdered material, comprising in combination a ribbon loom, capable of producing a tubular double fabric with interposed flat-woven parts, means for periodically interrupting the weaving operation, a filling device capable of acting during the periodic interruptions in the weaving operation, an automatic measuring device, a cutting device capable of cutting off the pocket-shaped portions of the fabric transversely through the interposed flat-woven parts and means operatively connected to the ribbon loom for attaching a label to each portion of the fabric to be cut off and comprising means for drawing out a thread from said portion to be detached and means for attaching said label to said thread, as set forth.

5. An arrangement for the continuous filling of pocket-shaped textile fabrics with granular and powdered material, comprising in combination a ribbon loom with vertical warp threads, capable of producing a tubular double fabric with interposed flat-woven parts and continuous flat lateral edges, means for periodically interrupting the weaving operation, a filling device capable of acting during the periodic interruptions in the weaving operation, an automatic measuring device and an endless conveyor band having sets of driving needles at intervals capable of advancing the web of woven fabric, as set forth.

6. An arrangement for the continuous filling of pocket-shaped textile fabrics with granular and powdered material, comprising in combination a ribbon loom, capable of producing a tubular double fabric with interposed flat-woven parts and continuous flat lateral edges, means for periodically interrupting the weaving operation, a filling device capable of acting during the periodic interruptions in the weaving operation, an automatic measuring device, a cutting device capable of cutting off the pocket-shaped portions of the fabric transversely through the interposed flat-woven parts and a member capable of being introduced from above and from the side into the pockets and of being turned, substantially perpendicularly to the web, as and for the purpose set forth.

7. An arrangement for the continuous filling of pocket-shaped textile fabrics with granular and powdered material, comprising in combination a ribbon loom, capable of producing a tubular double fabric with interposed flat-woven parts and continuous flat lateral edges, means for periodically interrupting the weaving operation, a filling device capable of acting during the periodic interruptions in the weaving operation, an automatic measuring device, an endless conveyor band having sets of driving needles at intervals capable of advancing the web of woven fabric and a cutting device capable of cutting through the web between the sets of needles as set forth.

8. An arrangement for the continuous filling of pocket-shaped textile fabrics with granular and powdered material, comprising in combination a ribbon loom, capable of producing a tubular double fabric with interposed flat-woven parts and continuous flat lateral edges, means for periodically interrupting the weaving operation, a filling device capable of acting during the periodic interruptions in the weaving operation, an automatic measuring device, an endless conveyor band having sets of driving needles at intervals capable of engaging the web of woven fabrics for advancing the latter and means for periodically operating said conveyor band and comprising the combination with the weaving frame (46) of the ribbon loom of a striker (104) on said weaving frame, a vertical rod slidably mounted on the loom below said striker so as to be capable of actuation by the striker, a ratchet wheel (107) having an axle journalled in the loom, a ratchet lever operatively connected to said vertical rod and having a pawl capable of engaging and turning said ratchet wheel to the extent of one tooth every time the vertical rod is actuated by the striker and means comprising a driving belt (108) operatively connected to the axle of the ratchet wheel and the conveyor belt.

9. An arrangement for the continuous filling of pocket-shaped textile fabrics with granular and powdered material, comprising in combination a ribbon loom, capable of producing a tubular double fabric with interposed flat-woven parts and continuous flat lateral edges, said ribbon loom having a cam shaft (48), means for periodically interrupting the weaving operation, a filling device capable of acting during the periodic interruptions in the weaving operation, an automatic measuring device, a cutting device capable of cutting off the pocket-shaped portions of the fabric transversely through the interposed flat-woven parts, a member capable of being introduced from above and from the side into the pockets and of being turned substantially perpendicularly to the web, for opening out the said pockets, and means operatively connected to the ribbon loom for actuating said cutting device and opening member in turn, comprising a rod (61), a spiral spring (62) surrounding said rod, a toothed rack (60) connected to the said rod, a toothed wheel (59) engaging the said rack, a belt passed round the hub of the said toothed wheel, pedals connected to both ends of the said belt and pivoted on the ribbon loom, and cams (55, 55') on the cam shaft (48) and capable of acting alternately upon the said pedals.

10. An arrangement for the continuous filling of pocket-shaped textile fabrics with granular and powered material, comprising in combination a ribbon loom, capable of producing a tubular double fabric with interposed flat-woven parts and continuous flat lateral edges and having a cam shaft (48) and a batten (47), means for periodically interrupting the weaving operation, a filling device capable of acting during the periodic interruptions in the weaving operation, an automatic measuring device, and means for the opening of the tubular parts of the fabric forming the packets to be filled, comprising a rod (7) mounted on the batten (47), a sleeve (8) slidably mounted on said rod, a semi-circular flat opening member (10), a link (11) connected to said opening member (10) and to said rod (7), a link joint (9) connected to the said sleeve (8) and member (10) and means operatively connected to said cam shaft for moving the opening member (10) into the packets to be filled.

11. An arrangement for the continuous filling of pocket-shaped textile fabrics with granular and powdered material, comprising in combination a ribbon loom, capable of producing a tubular double fabric with interposed flat-woven parts and continuous flat lateral edges and having a cam shaft (48) and a batten (47), means for periodically interrupting the weaving operation, a filling device capable of acting during the periodic interruptions in the weaving operation, an automatic measuring device, means for the opening of the tubular parts of the fabric forming the packets to be filled, comprising a supporting bed fixed on the batten (47), a support (72), slidably mounted in said supporting bed so as to be capable of moving horizontally along the batten, a pair of vertical spindles (73) passed loosely through said support, a union (79), connecting the top ends of the spindles (73), spiral springs surrounding the spindles (73) and bearing against the union (79), a block (75) connecting the lower ends of the spindles (73), a pair of spindles (76) passed through the said block (75) and extending therein perpendicular to the spindles (73), spiral springs surrounding the said spindles (76), a union (78) connecting the spindles (76) at the one end, a union (80) connecting the spindles (76) at the other end, a rod (7) connected to the union (80), a sleeve (8) slidably mounted on said rod, a semi-circular flat opening member (10), a link (11) connected to said opening member (10) and to said rod (7), a link joint (9), connected to the said sleeve (8) and member (10) and means operatively connected to said cam shaft for reciprocating the support (12).

12. An arrangement for the continuous filling of pocket-shaped textile fabrics with granular and powdered material, as set forth in claim 11 and having an angular attachment (81) on the union (80) and the sleeve (8) passed through the said attachment (81), a striker (87), a vane (82) serving for the control of the member (10), mounted on one end of sleeve (8) so as to project therefrom in the path of the striker (87) so as to be capable of coacting with the striker and a spiral spring (83) arranged between the attachment (81) and the vane (82), for the purposes set forth.

13. An arrangement for the continuous filling of pocket-shaped textile fabrics with granular and powdered material, comprising in combination a ribbon loom, having a cam shaft (48) and capable of producing a tubular double fabric with interposed flat-woven parts, means for periodically interrupting the weaving operation, a filling device capable of acting during the periodic interruptions in the weaving operation, an automatic measuring device, and means for attaching a label to each portion to be detached from the fabric, comprising a magazine for containing a supply of perforated labels, a carrier (26) capable of receiving a label from said magazine and having an axle (25) supported on the loom so as to enable the carrier to rock about said axle, a needle (18) having a hook (19) capable of engaging a thread from each length of woven fabric, the said needle (18) being slidably mounted in the loom so as to be displaceable in a horizontal plane, means operatively connected to the needle (18) and to the cam shaft (48) for advancing said needle through the perforation in a label in the carrier (26) so as to enable said hook to engage said thread and for again retracting the needle for pulling the said thread through the perforation (17) as a loop and means (20) capable of spreading out the sides of said loop for the purposes set forth.

14. An arrangement for the continuous filling of pocket-shaped textile fabrics with granular and powdered material, comprising in combination a ribbon loom, having a cam shaft (48) and capable of producing a tubular double fabric with interposed flat-woven parts and continuous flat lateral edges, means for periodically interrupting the weaving operation, a filling device capable of acting during the periodic interruptions in the weaving operation, an automatic measuring device, means for attaching a label to each portion to be detached from the fabric, comprising a support (99) mounted on the loom and having a central slot (102), a magazine on said support for containing a supply of perforated labels, a carrier (26) capable of receiving a label (6) from said magazine and having an axle (25) supported on the loom so as to enable the carrier to rock about said axle, a needle (18) having a hook (19), capable of engaging a thread from each length of woven fabric, the said needle (18) being slidably mounted in said support (99) so as to be displaceable in a horizontal plane, means operatively connected to the needle (18) and to the cam shaft (48), for advancing the said needle through the perforation in a label in the carrier (26) so as to enable said hook to engage said thread and for again retracting the needle for pulling the said thread through the perforation (17) as a loop, a member having bent limbs (20) capable of spreading out the said loop and mounted on a spindle (21), said spindle (21) being rotatably mounted at the lower end of the said support and capable of moving vertically thereon, a spiral spring surrounding the said spindle, a substantially vertical slot (21) in the said spindle, bent at its lower end in the form of part of a 90° helix, a pin (101) mounted on the support (99) so as to project therefrom into the slot (21) and capable of turning the spindle during its vertical upward movement for spreading out the loop and means operatively connected to the cam shaft (48) for seizing the label and moving it downwards and backwards during the upward motion of the rod (101) and comprising a shank (23) with a gripper (22) thereon.

15. An arrangement for the continuous filling of pocket-shaped textile fabrics with granular and powdered material, comprising in combination a ribbon loom having a cam shaft (48) and capable of producing a tubular double fabric with interposed flat-woven parts, means for periodically interrupting the weaving operation, a filling device capable of acting during the periodic interruptions in the weaving operation, an automatic measuring device, and means for attaching a label to each portion to be detached from the fabric, comprising a support (99) mounted on the loom and having a central slot (102), a magazine on said support for containing a supply of labels, a spring in same magazine for forcing forward the labels therein, a guide (38) on said magazine, a knife (39) slidable in said guide, a carrier (26) capable of receiving a label (6) from said magazine, and having an axle (25) for supporting it on the loom for enabling the carrier to rock about said axle, a guide (30) on said carrier for the labels, said carrier having a back wall (28), a slot (27) at the bottom of said back wall, two leaf springs (29) on said carrier capable of pressing the label against the said back wall, a needle (18) having a hook (19) capable of engaging a thread from each length of woven fabric the said needle (18) being slidably mounted in said support (99) so as to be displaceable in a horizontal plane, means operatively connected to the needle (18) and to the cam shaft (48) for advancing the said needle through the perforation in a label in the carrier (26) so as to enable said hook to engage said thread and for again retracting the needle for pulling the said thread through the perforation (17) as a loop, a member having bent limbs (20) capable of spreading out the said loop and mounted on a spindle (21), said spindle (21) being rotatably mounted at the lower end of the said support and capable of moving vertically thereon, a spiral spring surrounding the said spindle, a substantially vertical slot (21) in the said spindle, bent at its lower end in the form of part of a 90° helix, a pin (101) mounted on the support (99) so as to project therefrom into the slot (21) and capable of turning the spindle during its vertical upward movement for spreading out the loop and means operatively connected to the cam shaft (48) for seizing the label and moving it downwards and backwards during the upward motion of the rod (101) and comprising a shank (23) with a gripper (22) thereon.

16. An arrangement for the continuous filling of pocket-shaped textile fabrics with granular and powdered material as set forth in claim 15, and having the axle (25) of the carrier (26) rotatably mounted in the arms of a stirrup (24) pivoted on the loom.

17. An arrangement for the continuous filling of pocket-shaped textile fabrics with granular and powdered material as set forth in claim 15, and having the axle (25) of the carrier (26) rotatably mounted in the arms of a stirrup (24) pivoted on the loom; a pinion (31) fixed to the axle (25), a toothed segment (32) fixed on the loom and in engagement with said pinion, and means actuatable by the cam shaft (48) for rocking the stirrup (24) for the purpose set forth.

18. An arrangement for the continuous filling of pocket-shaped textile fabrics with granular and powdered material as set forth in claim 14, having the needle guided horizontally in the support (99) and the shank (23) with the gripper thereon guided in an inclined direction in said support.

In testimony whereof I have signed my name to this specification.

PAUL v. KÖRÖSY.